United States Patent
Lee et al.

(10) Patent No.: US 11,228,801 B2
(45) Date of Patent: Jan. 18, 2022

(54) METHOD AND APPARATUS FOR PROVIDING MULTI-VIEW STREAMING SERVICE

(71) Applicant: SK Telecom Co., Ltd., Seoul (KR)

(72) Inventors: Jongmin Lee, Seoul (KR); Kyungjun Lee, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 0 days.

(21) Appl. No.: 15/623,419

(22) Filed: Jun. 15, 2017

(65) Prior Publication Data

US 2017/0289588 A1    Oct. 5, 2017

Related U.S. Application Data

(63) Continuation of application No. PCT/KR2016/001457, filed on Feb. 13, 2016.

(30) Foreign Application Priority Data

Feb. 13, 2015 (KR) ........................ 10-2015-0022524

(51) Int. Cl.
*H04N 21/43* (2011.01)
*H04N 21/435* (2011.01)
(Continued)

(52) U.S. Cl.
CPC ... *H04N 21/43072* (2020.08); *H04N 21/2187* (2013.01); *H04N 21/2387* (2013.01);
(Continued)

(58) Field of Classification Search
CPC ....... H04N 21/21805; H04N 21/23424; H04N 21/2365; H04N 21/242; H04N 21/431;
(Continued)

(56) References Cited

U.S. PATENT DOCUMENTS 8,505,054 B1 *   8/2013  Kirley ............... H04N 21/4307
                                                            725/74
2009/0009605 A1 *   1/2009  Ortiz ..................... H04N 5/232
                                                            348/157
(Continued)

FOREIGN PATENT DOCUMENTS

CN       1826572 A       8/2006
CN       1972440 A       5/2007
(Continued)

OTHER PUBLICATIONS

International Search Report for PCT/KR2016/001457 dated Jul. 8, 2016, citing the above reference(s).
(Continued)

*Primary Examiner* — Jeremy S Duffield
(74) *Attorney, Agent, or Firm* — Hauptman Ham, LLP

(57) ABSTRACT

The disclosure relates to a method and apparatus for providing a multi-view streaming service having at least two screens. According to an embodiment, the multi-view streaming service providing apparatus includes a first screen control module, a second screen control module, and a playback control module. The first screen control module supports playback processing of a first MPEG media transport (MMT) streaming data for a first screen. The second screen control module supports playback processing of a second MMT streaming data for a second screen. The playback control module identifies playback time information inserted in each media processing unit (MPU) of the first and second streaming data in response to a request for multi-view streaming playback, and controls the first and second screen control modules to synchronize and play the respective MPUs of the first and second streaming data in accordance with the identified playback time information.

4 Claims, 7 Drawing Sheets

(51) Int. Cl.
- *H04N 21/2187* (2011.01)
- *H04N 21/2387* (2011.01)
- *H04N 21/242* (2011.01)
- *H04N 21/431* (2011.01)
- *H04N 21/485* (2011.01)
- *H04N 21/845* (2011.01)
- *H04N 21/854* (2011.01)

(52) U.S. Cl.
CPC ....... *H04N 21/242* (2013.01); *H04N 21/4302* (2013.01); *H04N 21/435* (2013.01); *H04N 21/4312* (2013.01); *H04N 21/4858* (2013.01); *H04N 21/8456* (2013.01); *H04N 21/854* (2013.01)

(58) Field of Classification Search
CPC ........... H04N 21/4312; H04N 21/4347; H04N 21/6377; H04N 21/6587; H04N 21/2387; H04N 21/2187; H04N 21/41407; H04N 21/4302; H04N 21/43072; H04N 21/435; H04N 21/4858; H04N 21/8456; H04N 21/854

See application file for complete search history.

(56) References Cited

U.S. PATENT DOCUMENTS

| | | | | |
|---|---|---|---|---|
| 2010/0086021 | A1* | 4/2010 | Utagawa | H04N 21/2381 375/240.01 |
| 2011/0093605 | A1 | 4/2011 | Choudhury et al. | |
| 2014/0071344 | A1* | 3/2014 | Francisco | H04N 21/242 348/500 |
| 2014/0150014 | A1* | 5/2014 | Aitken | H04N 21/64322 725/33 |
| 2014/0204962 | A1* | 7/2014 | Park | H04N 21/2389 370/509 |
| 2015/0120956 | A1* | 4/2015 | Bouazizi | H04N 21/23439 709/231 |
| 2015/0181003 | A1* | 6/2015 | Kim | H04N 21/2381 370/474 |
| 2015/0201207 | A1* | 7/2015 | Yie | H04N 19/463 375/240.26 |
| 2016/0100220 | A1* | 4/2016 | Toma | H04N 21/44004 725/110 |
| 2016/0173919 | A1* | 6/2016 | Iguchi | H04N 21/44004 725/116 |
| 2016/0269794 | A1* | 9/2016 | Shimura | H04N 21/44218 |
| 2018/0041820 | A1* | 2/2018 | Xu | H04N 21/8456 |

FOREIGN PATENT DOCUMENTS

| | | |
|---|---|---|
| CN | 102577312 A | 7/2012 |
| CN | 103338340 A | 10/2013 |
| JP | 2013-535886 A | 9/2013 |
| JP | 2014014077 A | 1/2014 |
| JP | 2014-116662 A | 6/2014 |
| KR | 1020100058599 A | 6/2010 |
| KR | 1020100081354 A | 7/2010 |
| KR | 1020130008436 A | 1/2013 |

OTHER PUBLICATIONS

Fujihashi et al., "A Basic Method of Traffic Reduction for Multi-view Video Streaming with Multi-users," 74th time (Heisei 24(2012)) of Information Processing Society of Japan National Conference Lecture Collected Papers (3), Mar. 6, 2012, General Incorporated Foundation Information Processing Society of Japan, the 3-281st to 3-282nd pages.

Japanese Office Action dated Jun. 5, 2018, issued in corresponding Japanese Patent Application No. 2017-554229, citing the above references.

Chinese Office Action dated Jun. 28, 2019, in connection with the Chinese Patent Application No. 201680007284.4 citing the above reference(s).

* cited by examiner

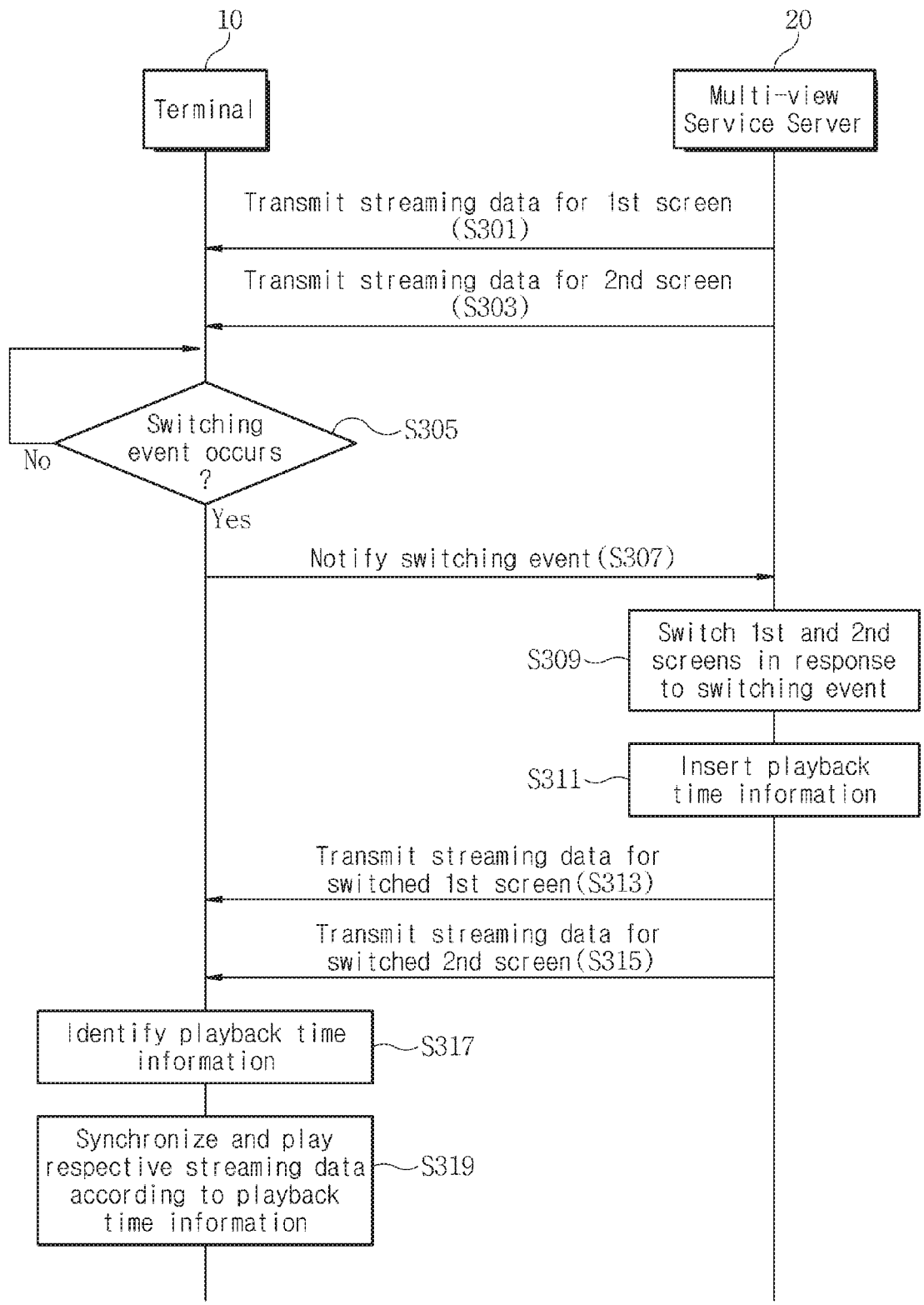

METHOD AND APPARATUS FOR PROVIDING MULTI-VIEW STREAMING SERVICE

CROSS-REFERENCE TO RELATED APPLICATIONS

The present application is a continuation of International Patent Application No. PCT/KR2016/001457, filed on Feb. 13, 2016, which is based upon and claims the benefit of priority to Korean Patent Application No. 10-2015-0022524, filed on Feb. 13, 2015. The disclosures of the above-listed applications are hereby incorporated by reference herein in their entirety.

TECHNICAL HELD

The disclosure relates to streaming data providing technology.

BACKGROUND

The statements in this section merely provide background information related to the disclosure and do not necessarily constitute prior art.

With the recent advent of various video services in the Internet environment, the demand for high-definition live broadcasting is gradually increasing. In addition, various attempts to provide such video services in a live streaming manner are made in these days.

Streaming refers to the transmission of content, such as video or audio, from a server to a client's terminal over a network such as the Internet. Since data is processed as if water is flowing, it is called streaming. The server divides the data into a plurality of packets to be delivered to the client, and the client collects such packets received from the server, restores the packets to their original form, and plays them. At this time, playback and packet reception occur simultaneously. A series of related packets is called a stream, and a set of such packets is called streaming data.

A recent streaming service may support a multi-view function. A multi-view service is one of picture-in-picture (PIP) services, which means that a sub-screen is displayed in a state where a main screen is being displayed. However, the streaming service that receives and plays streaming data in real time provides the streaming data independently to each of the main screen and the sub-screen, resulting in a difference in playback time between the main screen and the sub-screen.

SUMMARY

The disclosure has an object of implementing a method and apparatus for providing a multi-view streaming service using the moving picture experts group (MPEG) media transport (MMT) technology.

Another object of the disclosure is to implement a multi-view streaming service providing method and apparatus capable of reducing a time difference between a first screen and a second screen in a playback of multi-view streaming data by synchronizing the streaming data of the first and second screens.

Still another object of the disclosure is to implement a multi-view streaming service providing method and apparatus capable of constructing and playing suitable streaming data in real time according to information on various events such as an event of switching between the first and second screens or an event of adjusting the size of a specific screen.

However, the disclosure is not limited to the above objects, and any other object, even though not mentioned herein, may be well understood from the following description.

In order to accomplish the above objects, a multi-view streaming service providing apparatus according to an embodiment of the disclosure may include a first screen control module configured to support playback processing of a first MPEG media transport (MMT) streaming data for a first screen; a second screen control module configured to support playback processing of a second MMT streaming data for a second screen; and a playback control module configured to identify playback time information inserted in each media processing unit (MPU) of the first and second streaming data in response to a request for multi-view streaming playback, and to control the first and second screen control modules to synchronize and play the respective MPUs of the first and second streaming data in accordance with the identified playback time information.

In order to accomplish the above objects, a multi-view streaming service providing method according to an embodiment of the disclosure may include steps of, at a terminal, transmitting a request for a first MPEG media transport (MMT) streaming data for a first screen and a second MMT streaming data for a second screen to a multi-view service server; at the terminal, identifying playback time information inserted in each media processing unit (MPU) of the first and second streaming data when the first and second streaming data are received from the multi-view service server; and at the terminal, synchronizing and playing the respective MPUs of the first and second streaming data in accordance with the identified playback time information.

In order to accomplish the above objects, a multi-view streaming service providing method according to an embodiment of the disclosure may include steps of, at a multi-view service server, receiving a request for a first MPEG media transport (MMT) streaming data for a first screen and a second MMT streaming data for a second screen from a terminal; at the multi-view service server, inserting playback time information in each media processing unit (MPU) of the first and second streaming data; and at the multi-view service server, transmitting the respective MPUs of the first and second streaming data to the terminal.

In addition, the disclosure may further provide a computer-readable recording medium that stores a program for executing the aforesaid multi-view streaming service providing method.

According to the multi-view streaming service providing method and apparatus of the disclosure, it is possible to provide a multi-view streaming service using the MPEG media transport (MMT) technology.

Additionally, according to the disclosure, it is possible to remarkably reduce a time difference between the first and second screens in a playback of multi-view streaming data by synchronizing the streaming data of the first and second screens. Thus, user convenience may be improved.

Further, according to the disclosure, it is possible to receive and play suitable streaming data in real time according to information on various events such as an event of switching between the first and second screens or an event of adjusting the size of the second screen. Therefore, even though various events occur, it is allowed to use the multi-view streaming service without a time difference between the first and second screens.

Other various advantages and effects will be disclosed explicitly or implicitly in embodiments of the disclosure to be described below in detail.

DESCRIPTION OF DRAWINGS

FIG. 10 is a flow diagram illustrating a multi-view streaming service providing method according to still another embodiment of the disclosure.

DETAILED DESCRIPTION

Figure 1:
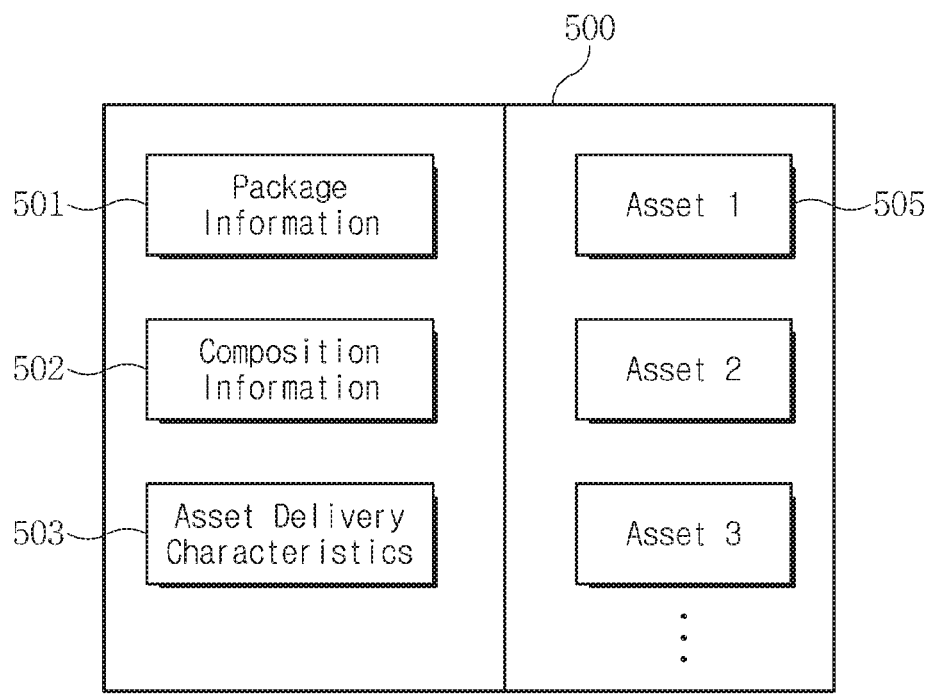
FIGS. 1 and 2 are exemplary diagrams illustrating MMT technology applied to the disclosure.

Hereinafter, embodiments of the disclosure will be described in detail with reference to the accompanying drawings.

In the following description and the accompanying drawings, well-known functions or elements may not be described or illustrated in detail to avoid obscuring the subject matter of the disclosure. The same elements may be denoted by the same reference numerals throughout the drawings.

The terms and words used herein should not be construed as limited to ordinary or dictionary definition terms, but should be construed in light of the meanings and concepts consistent with the subject matter of the disclosure on the basis of the principle that the inventor can properly define his own disclosure as the concept of the term to describe it in the best way. It is therefore to be understood that embodiments disclosed herein are merely exemplary and various equivalents or modifications thereof are possible.

Additionally, the terms including expressions "first", "second", etc. are used for merely distinguishing one element from other elements but do not limit the corresponding elements. The above expressions do not limit the sequence and/or importance of the elements.

Further, when it is stated that a certain element is "coupled to" or "connected to" another element, the element may be logically, electrically or physically coupled to or connected to another element. Namely, the element may be directly coupled or connected to another element, or a new element may exist between both elements.

Also, the terms used in describing various embodiments of the disclosure are only examples for describing a specific embodiment but do not limit such embodiments. Singular forms are intended to include plural forms unless the context clearly indicates otherwise. Unless defined differently, all terms used herein, which include technical terminologies or scientific terminologies, have the same meaning as that understood by a person skilled in the art to which the disclosure belongs. The terms "include", "comprise", and "have" as well as derivatives thereof, mean inclusion without limitation.

In addition, embodiments within the scope of the disclosure include computer-readable media having computer-executable instructions or data structures stored on computer-readable media. Such computer-readable media can be any available media that is accessible by a general purpose or special purpose computer system. By way of example, such computer-readable media may include, but not limited to, RAM, ROM, EPROM, CD-ROM or other optical disk storage, magnetic disk storage or other magnetic storage devices, or any other physical storage medium that can be used to store or deliver certain program codes formed of computer-executable instructions, computer-readable instructions or data structures and which can be accessed by a general purpose or special purpose computer system.

In the description and claims, the term "network" or "communication network" is defined as one or more data links that enable electronic data to be transmitted between computer systems and/or modules. When any information is transferred or provided to a computer system via a network or other (wired, wireless, or a combination thereof) communication connection, this connection can be understood as a non-transitory computer-readable medium. The non-transitory computer-readable instructions include, for example, instructions and data that cause a general purpose computer system or special purpose computer system to perform a particular function or group of functions. The computer-executable instructions may be binary, intermediate format instructions, such as, for example, an assembly language, or even source code.

In addition, the disclosure may be implemented in network computing environments having various kinds of computer system configurations such as PCs, laptop computers, handheld devices, multiprocessor systems, microprocessor-based or programmable consumer electronics, network PCs, minicomputers, mainframe computers, mobile phones, PDAs, pagers, and the like.

The disclosure may also be implemented in distributed system environments where both local and remote computer systems linked by a combination of wired data links, wireless data links, or wired and wireless data links through a network perform tasks. In such distributed system environments, program modules may be located in local and remote memory storage devices.

Hereinafter, the disclosure will be described on the assumption that MPEG media transport (MMT) technology is applied. However, this is only an example for convenience of explanation, and the disclosure does not necessarily apply to the MMT technology.

The terms used in the disclosure may be defined as follows.

A content component or a media component is defined as the media of a single type or a subset of the media of a single type, and may be, for example, a video track, movie subtitles, or an enhancement layer of video.

Content is defined as a set of content components, and may be, for example, a movie, a song, and the like.

Hybrid delivery means that two or more content components are transmitted simultaneously through two or more physically different types of networks.

A presentation is defined as an operation performed by one or more devices so that a user can experience one content component or one service (e.g., enjoying a movie).

A service is defined as one or more content components transmitted for presentation or storage.

Service information is defined as metadata describing one service, characteristics of the service, and components of the service.

Non-timed data is defined as all kinds of data elements consumed without specifying time. The non-timed data is data that does not have its own synchronization information for decoding and/or representing its media unit.

Timed data is defined as data elements associated with a particular time for decoding and presentation. The timed data is data having its own synchronization information for decoding and/or representing its media unit.

A media fragment unit (MFU) is a normal container independent of any particular codec and contains encoded media data being consumable independently by a media decoder. The MFU includes one file for media data or non-timed media data being decodable independently by the media decoder together with all or part of an access unit (AU) for timed media data. The MFU contains information which is usable in the transport layer and has a size smaller than or equal to that of the AU.

An MMT entity is an implementation of software or hardware that conforms to an MMT profile.

An MMT packet is a formatted unit of data created or consumed according to an MMT protocol.

An MMT payload is a formatted unit of data that carries a package or signals a message using the MMT protocol or the Internet application layer transport protocol (e.g., a real-time transport protocol (RTP)).

The MMT protocol is an application layer transport protocol for delivering the MMT payload over an IP network.

An MMT payload format is a format for payload of the MMT package or MMT signaling message to be delivered by the MMT protocol or the Internet application layer protocol (e.g., RTP).

Hereinafter, before describing embodiments of the disclosure, the MMT technology applied to the disclosure will be described in detail with reference to FIGS. 1 and 2.

Figure 2:
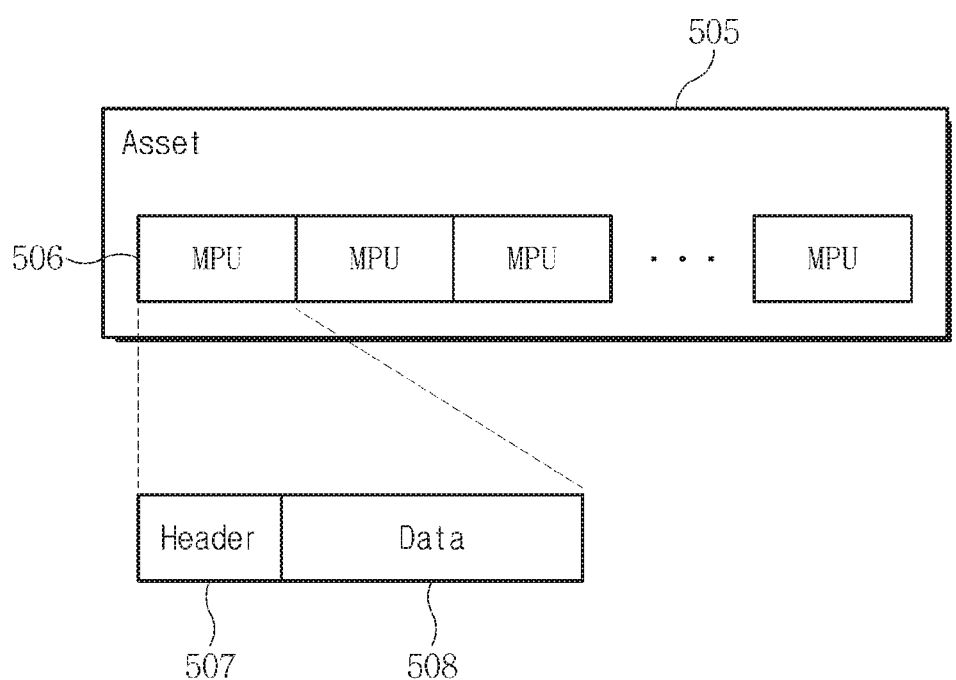

FIGS. 1 and 2 are exemplary diagrams illustrating MMT technology applied to the disclosure.

Referring to FIG. 1, an MMT package 500 is the largest logically structured MMT entity among data models defined in the MMT functional area, and means single independent content such as a movie. A live streaming server that provides a streaming data service may create and provide the MMT package to a terminal. As shown in FIG. 1, the MMT package 500 may be a logically structured collection of several entities. The MMT package 500 may include one or more assets 505, composition information 502, asset delivery characteristics (ADC) 503, and descriptive information, i.e., package information 501.

Among them, the composition information 502 includes information about a relationship, namely, spatial and temporal relations, among the MMT assets 505. If any content is composed of a plurality of MMT packages, the composition information 502 may further include information for indicating a relationship among the MMT packages.

The ADC 503 indicates quality of service (QoS) requirements and statistics for delivery of the asset 505. The plurality of assets 505 may be associated with one ADC 503. In this case, the ADC 503 may be used to set parameters of the MMT payload and the MMT protocol by an entity encapsulating the package for effective delivery of the asset 505. Also, the ADC 503 may include delivery characteristic information needed to determine a delivery condition of the MMT asset 505 or the MMT packet. For example, the ADC 503 may include a traffic description parameter and a QoS descriptor. This delivery characteristic information may be expressed in the form of parameters irrespective of the network environment.

The asset 505, which is the largest logical data unit, refers to a package element that encapsulates encoded media data such as audio, video or webpage data with a timed or non-timed attribute. The asset 505 means a data entity that contains data with the same delivery characteristics. For example, if the MMT package 500 which is the largest entity among data models defined in the MMT functional area refers to single independent content such as a movie, the asset 505 refers to a data unit, such as audio data, video data and script data, for constructing the MMT package 500.

Now, the asset 505 will be described in more detail with reference to FIG. 2. Referring to FIG. 2, the asset 505 may be composed of at least one MPU 506. Here, the MPU 506 refers to a media processing unit (MPU), which is a logical data object. A plurality of MPUs 506 that constitutes one asset 505 has the same asset ID.

In addition, the MPU 506 may be a comprehensive container for timed or non-timed data that is independent of any particular media codec. The MPU 506 may be encoded media data that can be processed completely and independently, and the processing of the MPU may mean encapsulation into a package or packetization for delivery. The MPU 506 may include one or more access units (AUs) for timed data. Here, the AU is the smallest data entity that can have time information. Additionally, the MPU 506 may include data that do not have AU boundaries for non-timed data. The MPU 506, which is a coded media data unit that can be processed completely and independently, may be composed of a header 507 and coded data 508. In addition, the MPU 506 of the disclosure may be further formed of a media fragment unit (MFU).

The MMT package 500 of the disclosure may be applied and operated on an MPU basis. In the following description, the processing is performed in the unit of MPU of MMT streaming data, but the disclosure is not limited thereto. The processing according to the disclosure may be also performed on a MFU basis, depending on system implementation types.

Now, a structure of an overall system for providing a multi-view streaming service according to an embodiment of the disclosure will be described.

Figure 3:
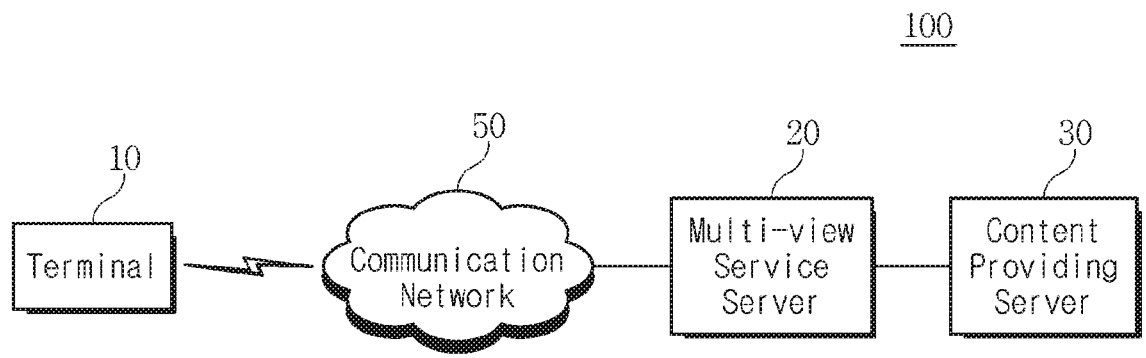
FIG. 3 is a schematic diagram illustrating a system for providing a multi-view streaming service according to an embodiment of the disclosure.

FIG. 3 is a schematic diagram illustrating a system for providing a multi-view streaming service according to an embodiment of the disclosure.

Referring to FIG. 3, in an embodiment of the disclosure, a system 100 may include a plurality of terminals 10, a multi-view service server 20, a content providing server 30, and a communication network 50.

The terminal 10 refers to a user apparatus capable of transmitting and receiving information to and from the multi-view service server 20 via the communication network 50 by a user's manipulation. The terminal 10 may perform voice or data communication through the communication network 50. For this, the terminal 10 may include a browser for transmitting and receiving information, a memory for storing a program and a protocol, a microprocessor for executing and controlling various kinds of programs, and the like. In particular, the terminal 10 according to an embodiment of the disclosure may process and play MPEG media transport streaming data (hereinafter, referred to as 'MMT streaming data') delivered from the multi-view service server 20. Also, the terminal 10 may support a process of displaying first MMT streaming data for a first screen and second MMT streaming data for a second screen in a PIP form.

In embodiments of the disclosure, the terminal 10 may be implemented in various forms. For example, the terminal 10 may be a mobile device such as a smart phone, a tablet personal computer (tablet PC), a personal digital assistant (PDA), a portable multimedia player (PMP), an MP3 player, and the like, or a stationary device such as a smart TV, a desktop computer, and the like.

According to a recent trend of convergence in digital devices, a great variety of mobile devices or their equivalences may be used as the terminal 10. In particular, any device capable of receiving MMT streaming data from the multi-view service server 20 via the communication network 50 and then processing the MMT streaming data may be used as the terminal 10 according to an embodiment of the disclosure.

The multi-view service server 20 delivers the MMT streaming data to the terminal 10 at the request of the terminal 10. As discussed above, the MMT streaming data refers to streaming data that can be delivered to the terminal 10 in the form of an MMT packet. The multi-view service server 20 may provide, for example, a broadcast service to the terminal 10 in accordance with an MMT streaming data format. In particular, when transmitting the MMT streaming data to the terminal 10, the multi-view service server 20 may sequentially transmit the first MMT streaming data for the first screen and the second MMT streaming data for the second screen in response to a multi-view streaming playback request of the terminal 10.

In addition, interworking with the content providing server 30, the multi-view service server 20 may convert data, delivered from the content providing server 30, into the MMT streaming data and then transmit the MMT streaming data to the terminal 10.

The terminal 10 and the multi-view service server 20 transmit and receive various kinds of information through the communication network 50. The communication network 50 may use various communication scheme, for example, wireless communication schemes, such as a wireless local area network (WLAN), Wi-Fi, WiBro, WiMAX, and a high speed downlink packet access (HSDPA), or wired communication schemes, such as Ethernet, a digital subscriber line (DSL) or xDSL such as ADSL or VDSL, a hybrid fiber coaxial cable (HFC), a fiber to the curb (FTTC), and a fiber to the home (FTTH).

The communication network 50 may include, for example, an access network (not shown in the drawings), a core network (not shown in the drawings), and Internet (not shown in the drawings).

Here, the access network is to support the access of the terminal 10 to the core network in accordance with wired/wireless communication schemes. The access network includes a plurality of base stations (BSs), also referred to as a base transceiver station (BTS), Node B, or evolved Node B (eNB), and controllers referred to as a base station controller (BSC) or a radio network controller (RNC). In addition, a digital signal processor and a radio signal processor, which are normally implemented with the base station, may be separated as a digital unit (DU) and a radio unit (RU). Then a plurality of RUs may be disposed respectively at a plurality of regions and connected to a centralized DU.

The core network which forms the communication network together with the access network performs a function to connect the access network to an external network such as Internet.

The core network performs circuit switching or packet switching and also manages and controls a packet flow in the mobile network. Additionally, the core network may manage mobility between frequencies, control traffic therein and in the access network, and control interworking with other network such as Internet. The core network may include a serving gateway (SGW), a packet data network (PDN) gateway (PGW), a mobile switching center (MSC), a home location register (HLR), a mobile mobility entity (MME), a home subscriber server (HSS), and/or the like.

Meanwhile, the Internet is a public communication network in which information is exchanged according to the TCP/IP protocol. The Internet is connected to the multi-view service server 20 and supports MMT streaming data, received from the multi-view service server 20, to be delivered to the terminal 10 through the core network and the access network.

On the other hand, the terminal 10 may transmit various commands for receiving MMT streaming data to the multi-view service server 20 via the access network, the core network, the Internet. The disclosure is, however, not limited thereto, and the multi-view service server 20 may be located in the core network and can be operated by the same operator as or different operator from that of the core network.

Also, any other widely-known or later-developed communication schemes may be further or alternatively applied to the disclosure.

Main elements and detailed operations of the terminal 10 and the multi-view service server 20 will be described later. A processor embedded in each apparatus according an embodiment of the disclosure may process a program command for executing the method of the disclosure. This processor may be a single-threaded processor in one implementation or a multi-threaded processor in another implementation. Further, this processor may process commands stored in a memory or any other storage.

Now, main elements and operating method of the terminal 10 according to an embodiment of the disclosure will be described.

Figure 4:
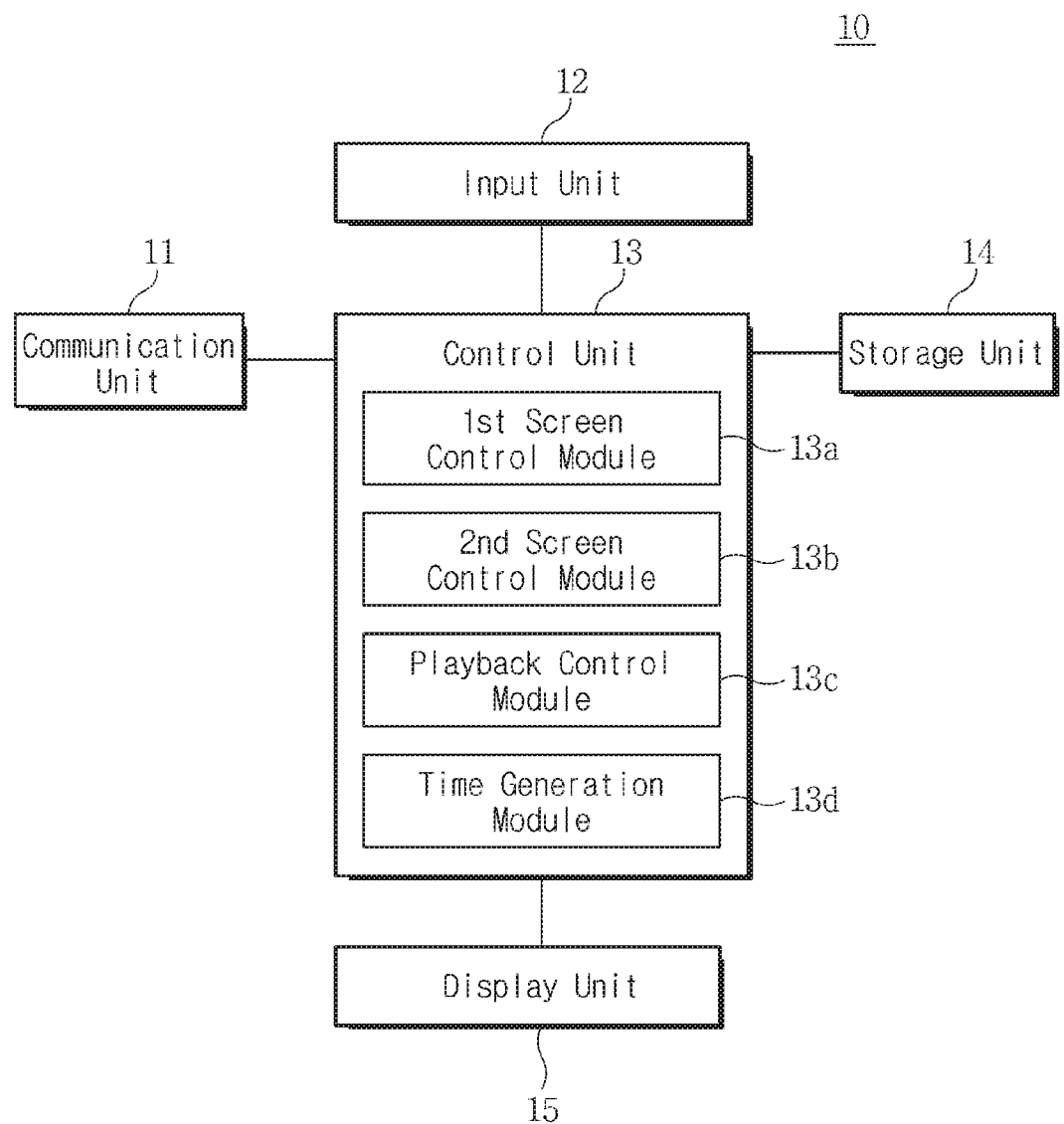
FIG. 4 is a block diagram illustrating main elements of a terminal according to an embodiment of the disclosure.

FIG. 4 is a block diagram illustrating main elements of a terminal according to an embodiment of the disclosure.

Referring to FIGS. 3 and 4, in an embodiment of the disclosure, the terminal 10 may include a communication unit 11, an input unit 12, a control unit 13, a storage unit 14, and a display unit 15.

The communication unit 11 may support a process of connecting to a neighboring access network (not shown in the drawings) for an access to a core network (not shown in the drawings). For example, the communication unit 11 may be connected to the access network through a process of discovering a base station (not shown in the drawings) located within a predetermined coverage, requesting an access to the discovered base station, and accessing to the base station. Since this process is well known, a detailed description will be omitted. In addition, when performing a communication procedure with the base station, the communication unit 11 may transmit user information to the base station. Basically, terminal identification information such as an international mobile subscriber identity (IMSI) may be transmitted to the base station. Therefore, while performing an access procedure with the core network, the base station may identify subscriber information by using the terminal identification information.

Additionally, the communication unit 11 sends a request for MMT streaming data transmission to the multi-view service server 20 via the communication network 50 and delivers received MMT streaming data to the control unit 13.

The input unit 12 creates an input signal associated with various kinds of information for setting or controlling a function of the terminal 10 in response to a user's manipulation and then delivers the input signal to the control unit 13. In particular, the input unit 12 may create and deliver a user input for requesting MMT streaming data transmission. For example, the input unit 12 may receive a user's input for executing a particular application for playback of MMT streaming data and also receive a user's input for selecting a specific channel through the executed application. In addition, the input unit 12 may receive a user's input for a multi-view streaming playback request. The multi-view streaming playback request may be created, for example, by an input of selecting a specific menu or button during playback of MMT streaming data in the particular application. In response to this request, this application may trigger a multi-view streaming function for playing a plurality of screens simultaneously.

The input unit 12 may include a key input tool such as a keyboard or a keypad, a touch input tool such as a touch sensor or a touch pad, a voice input tool, and a gesture input tool having at least one of a gyro sensor, a geomagnetic sensor, an acceleration sensor, a proximity sensor, and a camera.

Besides, all kinds of input tools being developed or to be developed may be included.

The control unit 13 performs the overall control of the terminal 10. In view of hardware, the control unit 13 may be configured to include at least one processor such as a central processing unit (CPU) and a micro processing unit (MPU), at least one execution memory (e.g., a register and/or a random access memory (RAM)) onto which data is loaded, and a bus for inputting or outputting data to or from the processor and the memory. In view of software, the control unit 13 may be configured to include a program routine or program data loaded onto the execution memory from a recording medium and then processed by the processor so as to perform a function defined in the terminal 10. Namely, any processable function in view of software among functions of the terminal 10 so as to request and receive MMT streaming data to and from the multi-view service server 20 and process the MMT streaming data through a multi-view function according to an embodiment of the disclosure may be considered as a function of the control unit 13.

The control unit 13 of the disclosure is functionally connected with one or more elements equipped for streaming data processing according to an embodiment of the disclosure. Namely, the control unit 13 is functionally connected with the communication unit 11, the input unit 12, the storage unit 14, and the display unit 15, and controls the supply of power to each element and the flow of signals for performing functions.

In particular, the control unit 13 according to an embodiment of the disclosure may support an MPEG-2 TS processing function capable of processing MPEG media transport (MMT) streaming data. For example, the control unit 13 may receive MMT streaming data composed of a plurality of MPU is delivered from the multi-view service server 20 and, if the streaming data is formed of a plurality of assets, may output the assets synchronized according to time information. In addition, the control unit 13 may process functions for performing various operations defined by the MMT protocol. Particularly, in order to support a multi-view streaming service function, the control unit 13 may include a first screen control module 13a, a second screen control module 13b, a playback control module 13c, and a time generation module 13d. Although the control unit 13 is described as having only the first and second screen control modules 13a and 13b, the disclosure is not limited thereto. Alternatively, the control unit 13 may have a plurality of screen control modules and thus support a multi-view streaming service function for a plurality of screens. Namely, when the first screen is displayed as a main screen, the second and third screens may be displayed simultaneously as sub-screens, and corresponding screen control modules may be included individually. Of course, the above-discussed functions may also be operated through a single module.

Hereinafter, for convenience of explanation, the first screen control module 13a for the main screen and the second screen control module 13b for the sub-screen will be exemplarily described.

The first screen control module 13a supports playback processing of the first MMT streaming data for the first screen. Here, the first screen may be the main screen displayed on the entire screen. The second screen control module 13b supports playback processing of the second MMT streaming data for the second screen. Here, the second screen may be the sub-screen that is displayed on the first screen and may have a display size smaller than that of the first screen.

A playback control of the MMT streaming data between the first and second screen control modules 13a and 13b may be performed through the playback control module 13c. Namely, when a multi-view streaming playback request is inputted through the input unit 12 while the first MMT streaming data for the first screen is being played through the first screen control module 13a, the playback control module 13c may control the second screen control module 13b to activate the second screen and then display the second MMT stream data through the second screen. At this time, the second MMT streaming data, e.g. scene, channel, etc., for the second screen displayed by the second screen control module 13b may be the same as or different from the first MMT streaming data, e.g. scene, channel, etc., for the first screen displayed by the first screen control module 13a.

Figure 5:
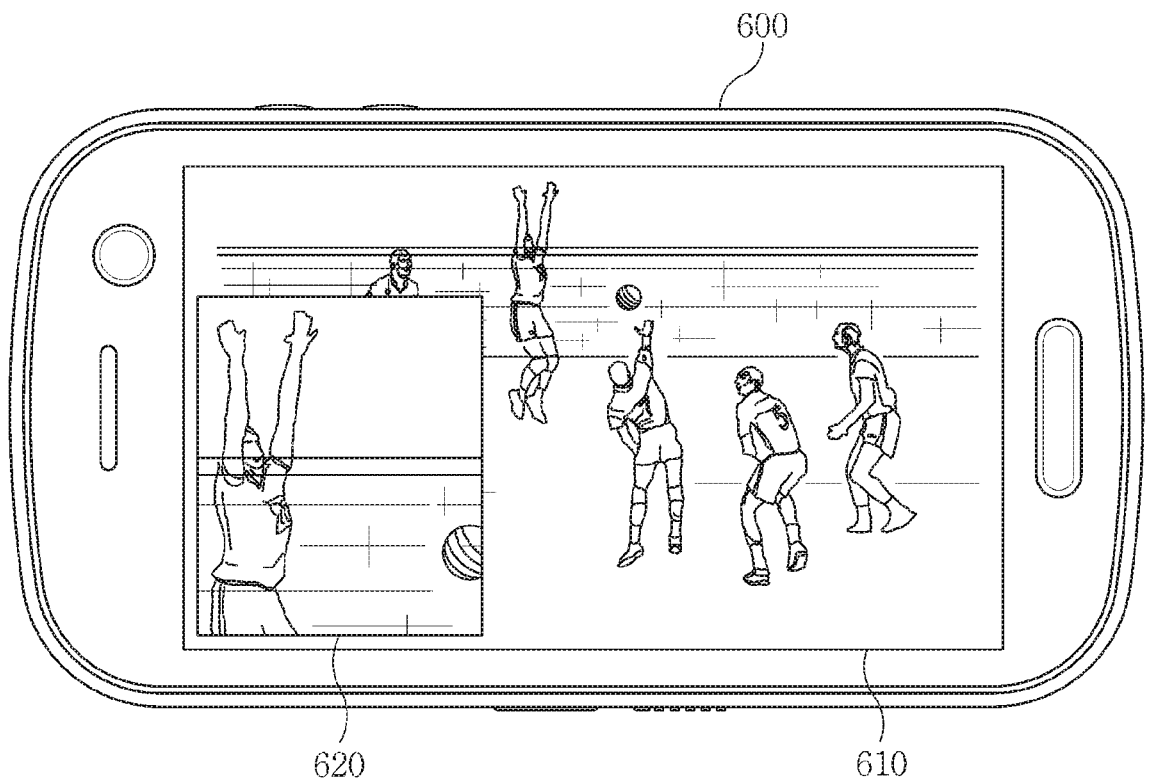
FIG. 5 is a terminal screenshot illustrating a multi-view streaming service providing method according to an embodiment of the disclosure.

Namely, as shown in FIG. 5, the first MMT streaming data may be played through the first screen 610 (i.e., the main screen) while a certain application 600 capable of playing the MMT streaming data is being executed. If the multi-view service function is activated through a specific menu or command button, the second screen 620 (i.e., the sub-screen) may be activated and displayed. The first and second screens 610 and 620 may play the same MMT streaming data (e.g., the same scene on the same channel) or different MMT streaming data (e.g., different scenes on the same channel or different channels). In case of the same MMT streaming data, the second. MMT streaming data may correspond to an enlarged part of the first MMT streaming data displayed through the first screen 610.

As mentioned above, the multi-view function in a typical streaming service has a problem in that a difference occurs in a playback time point of streaming data between the first screen 610 and the second screen 620. Namely, even though the same streaming data is played, the streaming data outputted through the first screen 610 or the second screen

620 may be delayed due to no synchronization between the first and second screens 610 and 620.

In order to solve this problem, the playback control module 13c of the disclosure as shown in FIG. 4 may identify playback time information inserted in each MPU before playing the first streaming data for the first screen and the second streaming data for the second screen, and then control the first and second screen control modules 13a and 13b to synchronize and play the respective MPUs of the first streaming data and the second streaming data in accordance with the identified playback time information. For example, suppose that the playback time information inserted in the MPU of the first MMT streaming data for the first screen requested by the first screen control module 13a is '10:10: 10.3', and the playback time information inserted in the MPU of the second MMT streaming data for the second screen requested by the second screen control module 13b is '10:10:10.3'. Also, further suppose that a time point of delivering the MPU of the first MMT streaming data for the first screen to the first screen control module 13a is '10:10: 10.0', and a time point of delivering the MPU of the second MMT streaming data for the second screen to the second screen control module 13b is '10:10:10.3'. In this case, if the first and second screen control modules 13a and 13b play back the respective streaming data as soon as each streaming data is received, the playback time points do not coincide with each other between the first and second screens. By the way, since the MPU of the first MMT streaming data for the first screen and the MPU of the second MMT streaming data for the second screen include the playback time information indicating the same time, the playback control module 13c may control the first and second screen control modules 13a and 13b to play each current MPU at the same time point 10:10:10.3) by increasing the previous MPU or delaying the current MPU of the first MMT streaming data for a certain time based on the playback time information rather than control each screen control module to immediately output the respective streaming data as soon as received.

As another example, suppose that a time point of delivering the MPU of the first MMT streaming data for the first screen to the first screen control module 13a is '10:10:10.5', and a time point of delivering the MPU of the second MMT streaming data for the second screen to the second screen control module 13b is '10:10:10.3'. Namely, suppose that the MPU of the first MMT streaming data for the first screen is received later than the inserted playback time information. In this case, the playback control module 13c may not immediately control the playback of streaming data but may control the second screen control module 13b so that the second MMT streaming data for the second screen is played simultaneously with the MPU of the first MMT streaming data for the first screen at 10:10:10.5. In other words, the MPUs having the same playback time information in the first MMT streaming data for the first screen and the second MMT streaming data for the second screen are controlled to be simultaneously played. Therefore, either one of the MPUs of the first MMT streaming data for the first screen and the second MMT streaming data for the second screen may be played later or sooner than the inserted playback time information.

In addition, the first screen control module 13a and the second screen control module 13b may process various event commands for the first screen and the second screen, respectively. For example, if an event of adjusting the size of the second screen (hereinafter, referred to as a resizing event) occurs, the second screen control module 13b notifies the resizing event to the multi-view service server 20. Here, the resizing event may occur, for example, by a multi-touch input on the second screen. In response to the resizing event, the second screen control module 13b may notify information about a previous size of the second screen, a changed current size of the second screen, a location of the second screen, or the like to the multi-view service server 20. In another example, if an event of switching between the first and second screens (hereinafter, referred to as a switching event) occurs, one of the first and second screen control modules 13a and 13b may notify the switching event to the multi-view service server 20 together with any necessary information.

The time generation module 13d identifies current time information of the terminal by using various resources equipped in the terminal 10. For example, the current time information may be identified through a GPS in the terminal 10.

The storage unit 14 may temporarily store application programs required for the operation of functions according to an embodiment of the disclosure and various data created during the execution of the application programs. Particularly, the storage unit 14 may store various commands for processing MMT streaming data.

The storage unit 14 may include mainly a program region and a data region. The program region stores related information for the operation of the terminal 10, such as an operating system (OS) for booting the terminal 10. The data region stores data created by the use of the terminal 10, and may store various commands for processing streaming data as mentioned above. The storage unit 14 may be formed of storage media such a flash memory, a hard disk, a multimedia card micro type memory (e.g., SD or XD memory, etc.), RAM, and ROM.

The display unit 15 may display information about an operating status and an operating result produced during the execution of functions of the terminal 10. Particularly, the display unit 15 of the disclosure may display information created by playing streaming data received from the multi-view service server 20. In addition, the display unit 15 may display the first MMT streaming data on the first screen and also display the second MMT streaming data on the second screen. Besides, the display unit 15 may further output a plurality of screen areas other than the first and second screens.

The display unit 15 may be implemented in the form of a single touch panel (or touch screen) together with the input unit 12. In this case, the display unit 15 may display various kinds of information produced according to user's touch action.

Additionally, the display unit 15 may be formed of a liquid crystal display (LCD), a thin film transistor LCD (TFT-LCD), an organic light emitting diodes (OLED), an LED, an active matrix organic LED (AMOLED), a flexible display, a 3-dimensional display, or the like. Some of them may have a transparent or light-penetrate form through which the outside can be seen. This may be configured in the form of a transparent display including a transparent OLED (TOLED).

Hereinbefore, main elements of the terminal 10 are described through FIG. 4. The elements shown in FIG. 4 are, however, not always essential, and more or less elements than shown may be used for the terminal 10. For example, the terminal 10 may further include an audio output unit (not shown in the drawings) for converting an electric audio signal into an analog signal and then outputting the signal. This audio output unit (not shown in the drawings) may perform a function of supporting the output of various kinds of information associated with playback of the MMT streaming data delivered from the multi-view service server 20.

Additionally, the main elements of the terminal 10 shown in FIG. 4 may be varied in position for convenience or any other reason. Although only the first screen control module 13a, the second screen control module 13b, the playback control module 13c, and the time generation module 13d are shown as modules for constituting the control unit 13, the disclosure is not limited to that. The control unit 13 may be formed of various modules for performing various functions. Although it is described for convenience of description that the first screen MMT streaming data and the second screen MMT streaming data are processed respectively through the first screen control module 13a and the second screen control module 13b, the first and second screen MMT streaming data may be processed through a single module.

In addition, although the first screen as the main screen and the second screen as the sub-screen are described exemplarily, two or more sub-screens may be created and each sub-screen may receive and output MMT streaming data separately.

Now, main elements and operating method of the multi-view service server 20 according to an embodiment of the disclosure will be described.

Figure 6:
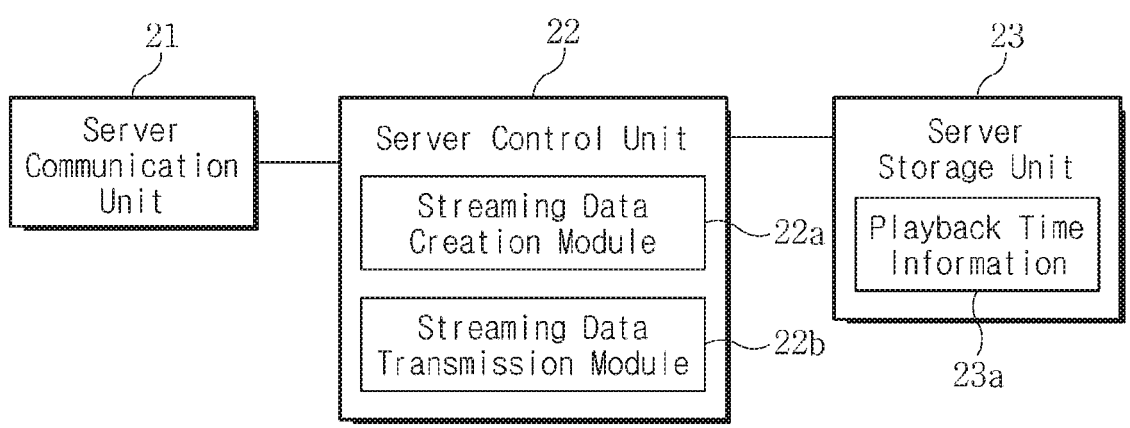
FIG. 6 is a block diagram illustrating main elements of a multi-view service server according to an embodiment of the disclosure.

FIG. 6 is a block diagram illustrating main elements of a multi-view service server according to an embodiment of the disclosure.

Referring to FIGS. 3 and 6, in an embodiment of the disclosure, the multi-view service server 20 may include a server communication unit 21, a server control unit 22, and a server storage unit 23.

The server communication unit 21 supports transmission and reception of information with the terminal 10. For example, the server communication unit 21 may receive a request for transmission of MMT streaming data from the terminal 10 and transmit the MMT streaming data to the terminal 10. The MMT streaming data may be composed of one or more assets, each of which may be composed of a plurality of MPUs. The server communication unit 21 may sequentially deliver a plurality of assets each having a plurality of MPUs to the terminal 10 through one channel in a streaming manner. In particular, the server communication unit 21 may sequentially deliver the first MMT streaming data for the first screen and the second MMT streaming data for the second screen to the terminal 10 at the request of the terminal 10. In this case, the first and second MMT streaming data may include the same asset ID or different asset IDs. Also, the first and second MMT streaming data may be delivered to the terminal 10 through the same channel or different channels.

When the server communication unit 21 transmits and receives information to and from the content providing server 30, the server communication unit 21 may transmit a request for specific content to the content providing server 30 and receive the requested content from the content providing server 30. At this time, the server communication unit 21 may send in advance a request for content required for creation of the first and second streaming data to the content providing server 30 under the control of the server control unit 22 and then receive the requested content before a multi-view streaming service request of the terminal 10.

The server control unit 22 is configured to perform overall control of the multi-view service server 20 according to an embodiment of the disclosure and may include a streaming data creation module 22a and a streaming data transmission module 22b.

Figure 7:
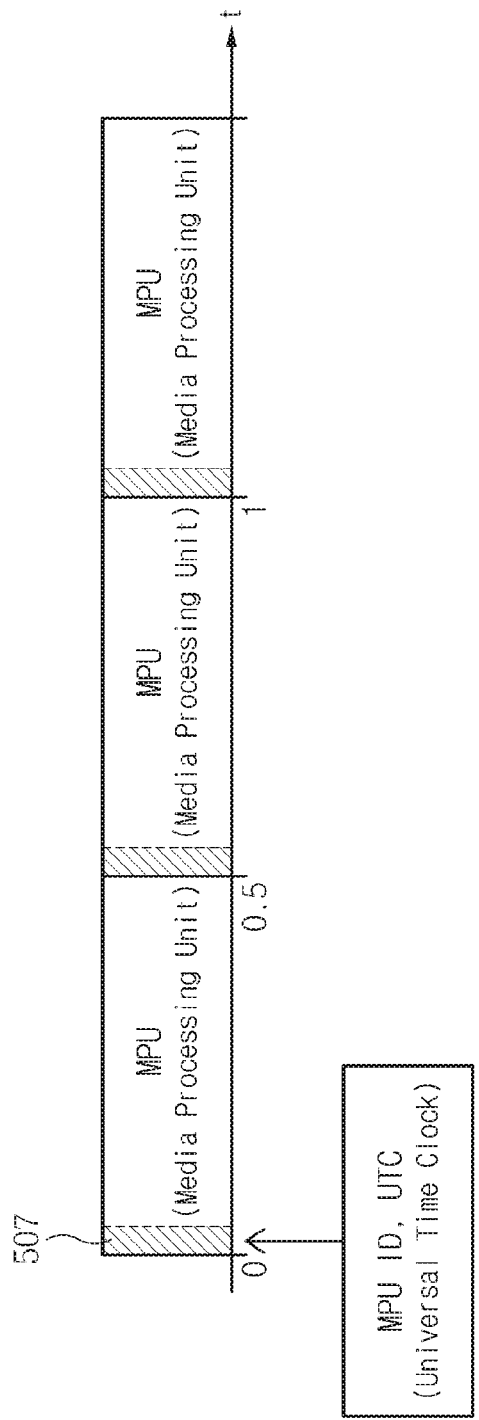
FIG. 7 is an exemplary diagram illustrating MMT streaming data according to an embodiment of the disclosure.

The streaming data creation module 22a may create MMT streaming data. For example, the streaming data creation module 22a may convert content delivered from the content providing server 30 into a streaming data form that meets the MMT protocol. Namely, the streaming data creation module 22a may determine a block size of the MPU and, based on the determined block size, construct each MPU to create the MMT streaming data. Here, the block size of the MPU may be varied according to a status of the terminal 10 and/or a status of the communication network 50 connected to the terminal 10. In addition, the streaming data creation module 22a may insert playback time information into each MPU and perform a necessary process so that the terminal 10 synchronizes and plays such MPUs according to the playback time information. For example, as shown in FIG. 7, the MMT streaming data may be composed of a plurality of MPUs, which may be sequentially delivered to the terminal 10. In this case, each MPU may include header information 507 as described above with reference to FIG. 2, and the header information 507 may include information necessary for data processing such as an MPU ID and a universal time clock (UTC). Here, the UTC means the playback time information.

In particular, the streaming data creation module 22a may create, in response to a request of the terminal 10, the first MMT streaming data for the first screen and the second MMT streaming data for the second screen. At this time, the streaming data creation module 22a may create the first MMT streaming data by adjusting the resolution and the number of frames of the first MMT streaming data to meet a supportable resolution of the first screen of the terminal 10, and also create the second MMT streaming data by adjusting the resolution and the number of frames of the second MMT streaming data to meet a supportable resolution of the second screen of the terminal 10. Namely, the streaming data creation module 22a may create the first and second MMT streaming data in accordance with the MMT scheme without any complicated encoding procedure. This makes it possible to quickly adjust the resolution and the frame number and immediately provide the MMT streaming data in response to a request of the terminal 10.

In addition, before a multi-view streaming service request is received from the terminal 10, the streaming data creation module 22a may request and receive in advance any information necessary for creation of the first MMT streaming data for the first screen and the second MMT streaming data for the second screen from the content providing server 30. For example, when the first MMT streaming data for the first screen is being provided to the terminal 10, the streaming data creation module 22a may request and receive in advance any information for creation of the second MMT streaming data for the second screen from the content providing server 30 in preparation for the multi-view streaming service request of the terminal 10. Therefore, when the multi-view streaming service request is received from the terminal 10, the streaming data creation module 22a may immediately provide the first MMT streaming data for the first screen and the second MMT streaming data for the second screen to the terminal 10.

In addition, the streaming data creation module 22a may process information about various events related to the multi-view streaming service notified by the terminal 10. For example, if a resizing event for the second screen is notified by the terminal 10, the streaming data creation module 22a may change the resolution and the number of frames of the second MMT streaming data for the second screen and then provide the changed second MMT streaming data to the terminal 10. Also, if a switching event is notified by the terminal 10, the streaming data creation module 22a may change the resolution and the number of frames of each of the first and second MMT streaming data and then provide the changed first and second MMT streaming data to the terminal 10. Namely, since the respective streaming data is provided in accordance with the MMT scheme as described above, it is possible to quickly change the resolution and the frame number of the MMT streaming data for the first and second screens and immediately provide the changed MMT streaming data to the terminal in response to any event notified by the terminal 10.

The streaming data transmission module 22b may transmit the MMT streaming data to the terminal 10 that requests the MMT streaming data. At this time, if the MMT streaming data requested by the terminal 10 includes a plurality of assets each having a plurality of MPUs, the streaming data transmission module 22b may enable the terminal 10 to sequentially receive such assets and MPUs. In addition, when there is any event information notified from the terminal 10, the streaming data transmission module 22b may support the streaming data creation module 22a to create corresponding MMT streaming data.

Meanwhile, the server control unit 22 may store and manage information about the terminal 10 that requests the MMT streaming data. If the terminal 10 requests the MMT streaming data, the server control unit 22 may check whether the terminal 10 is subscribed to the multi-view streaming service provided by the multi-view service server 20, and provide the MMT streaming data to the terminal 10 only subscribed to the multi-view streaming service.

The server storage unit 73 may store and manage various kinds of information necessary for the operation of the multi-view service server 20 according to an embodiment of the disclosure.

Hereinbefore, the main elements and operating method of the multi-view service server 20 according to an embodiment have been described.

In view of hardware, the multi-view service server 20 according to an embodiment of the disclosure has the same configuration as a typical web server or network server. However, in view of software, the multi-view service server 20 includes a program module implemented by means of computer languages such as C, C++, Java, Visual Basic, Visual C, and the like.

Meanwhile, the memory or storage unit equipped in each apparatus of the disclosure stores information therein. In one embodiment, the memory or storage unit is a non-transitory computer-readable medium. The memory or storage unit may be a volatile memory unit in one embodiment and may be a nonvolatile memory unit in another embodiment. In various embodiments, the memory or storage unit may include, for example, a hard disk device, an optical disk device, or any other high-volume storage device.

In addition, the term "module" used herein may refer to a component or device which is formed of software, hardware, or combination thereof, and performs certain tasks. The module may include, for example, components, such as software components, object-oriented software components, class components and task components, processes, functions, attributes, procedures, subroutines, segments of program code, drivers, data, databases, data structures, tables, arrays, and variables. The functionality provided for in the components and modules may be combined into fewer components and modules or further separated into additional components and modules.

Although this description and drawings illustrate exemplary device elements, the subject matters and functional operations disclosed herein may be implemented by different type digital electronic circuits or implemented by computer software, firmware or hardware including a structure disclosed herein and structural equivalent thereof, or any combination thereof. The subject matters disclosed herein may be implemented by at least one computer program product, namely at least one module regarding computer program commands encoded on a program storage medium so as to control the operation of a device according to the disclosure or allow execution thereby. A non-transitory computer-readable medium may be a machine-readable storage device, a machine-readable storage board, a memory device, a machine-readable composition of material affecting wave-type signaling, or a combination thereof.

Now, a multi-view streaming service providing method according to an embodiment of the disclosure will be described.

Figure 8:
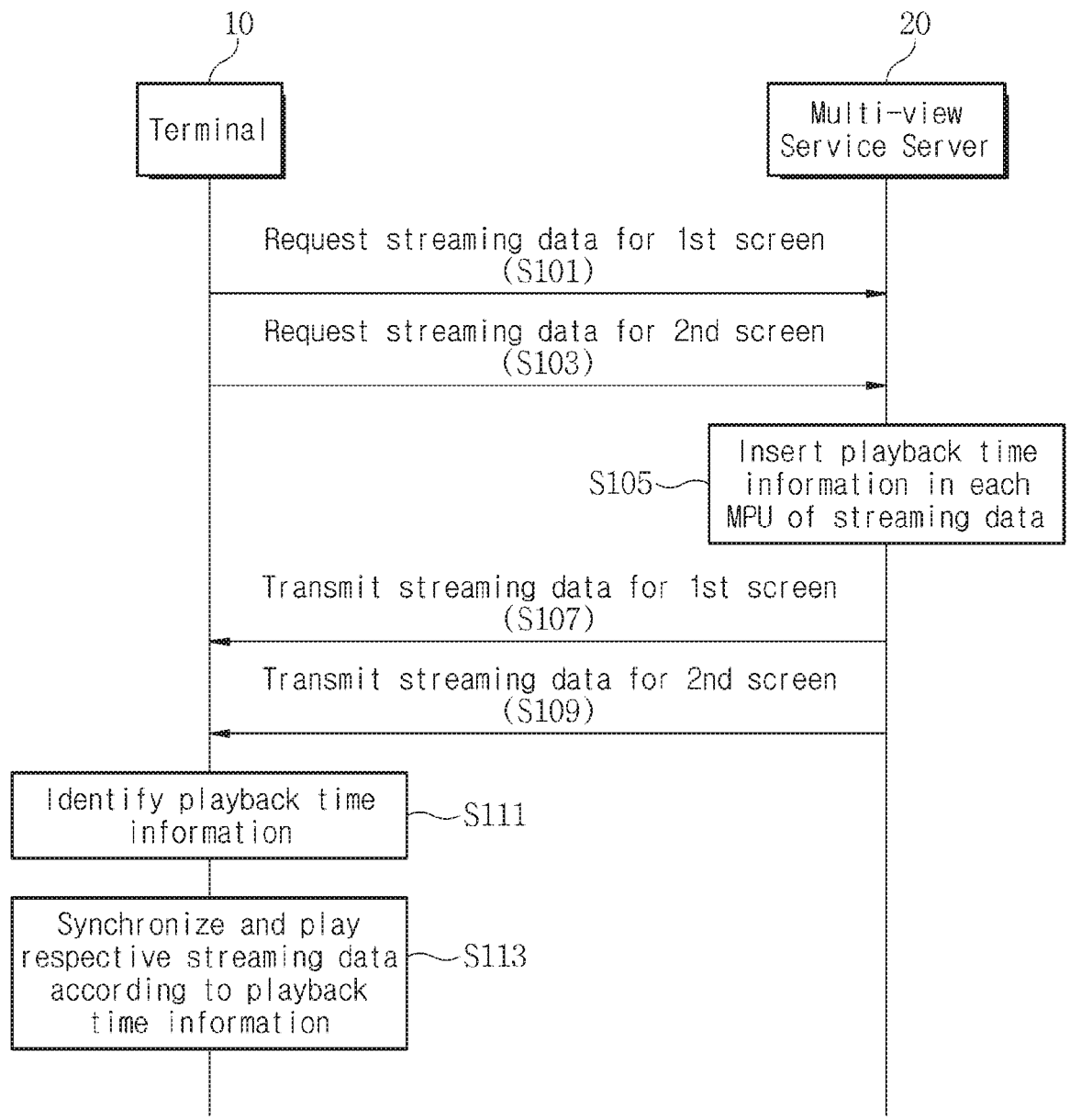
FIG. 8 is a flow diagram illustrating a multi-view streaming service providing method according to an embodiment of the disclosure.

FIG. 8 is a flow diagram illustrating a multi-view streaming service providing method according to an embodiment of the disclosure.

Referring to FIG. 8, in response to a user's input for multi-view streaming playback, the terminal 10 may send requests for the first MMT streaming data for the first screen and the second MMT streaming data for the second screen to the multi-view service server 20 (steps S101 and S103). These steps may be performed at the same time. Alternatively, when the multi-view streaming playback request is inputted while the first MMT streaming data for the first screen is being played, the terminal 10 may request the second MMT streaming data for the second screen.

Then the multi-view service server 20 creates each MMT streaming data (step S105). At this step, the multi-view service server 20 inserts playback time information into the MPU of the respective streaming data. Also, the multi-view service server 20 transmits the first streaming data for the first screen and the second streaming data for the second screen to the terminal 10 (steps S107 and S109).

Then the terminal 10 identifies the playback time information of each MPU and also identifies the current time information thereof (step S111). In addition, the terminal 10 may synchronize and play the MPUs of the respective streaming data in accordance with the identified playback time information (step S113).

For example, suppose that the playback time information inserted in each MPU of the first and second MMT streaming data received from the multi-view service server 20 is '10:10:10.3'. Also, further suppose that a time point of receiving the MPU of the first MMT streaming data for the first screen at the terminal 10 is '10:10:10.0', and a time point of receiving the MPU of the second MMT streaming data for the second screen at the terminal 10 is '10:10:10.3'. In this case, the terminal 10 may play each current MPU at the same time point (i.e., 10:10:10.3) by increasing the previous MPU or delaying the current MPU of the first MMT streaming data for a certain time based on the playback time information.

As another example, suppose that a time point of receiving the MPU of the first MMT streaming data for the first screen at the terminal 10 is '10:10:10.5', and a time point of delivering the MPU of the second MMT streaming data for the second screen at the terminal 10 is '10:10:10.3'. In this case, the terminal 10 may delay the playback of the previous MPU of the second MMT streaming data for a certain time and then play the first and second MMT streaming data simultaneously at 10:10:10.5.

In other words, the MPUs having the same playback time information in the first MMT streaming data for the first screen and the second MMT streaming data for the second screen are controlled to be simultaneously played. Therefore, either one of the MPUs of the first MMT streaming data for the first screen and the second MMT streaming data for the second screen may be played later or sooner than the inserted playback time information.

Furthermore, the disclosure may provide corresponding multi-view streaming services, depending on various events that occur at the terminal 10.

This will be described with reference to FIGS. 9 and 10.

Figure 9:
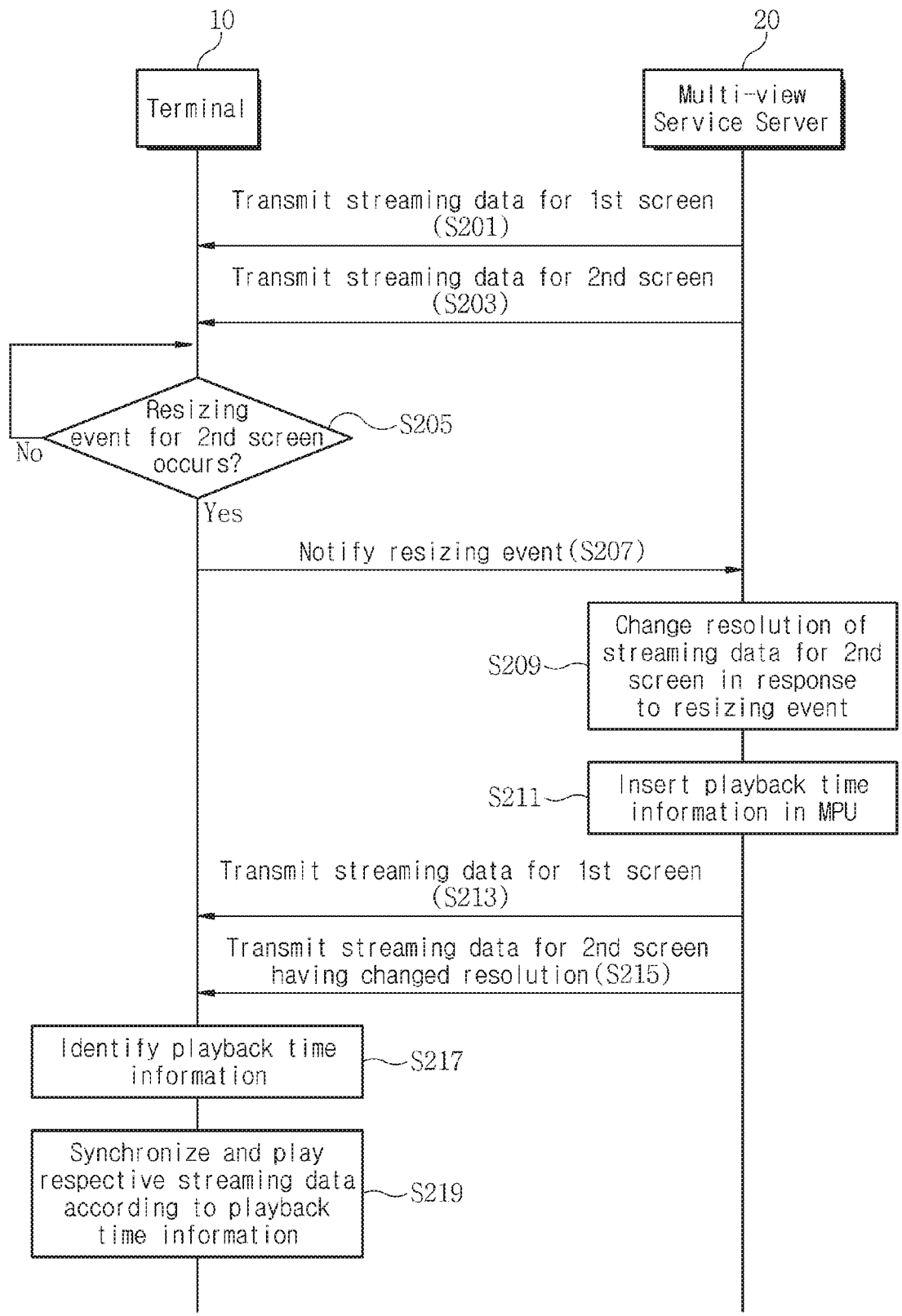
FIG. 9 is a flow diagram illustrating a multi-view streaming service providing method according to another embodiment of the disclosure.

FIG. 9 is a flow diagram illustrating a multi-view streaming service providing method according to another embodiment of the disclosure.

Referring to FIG. 9, in response to requests for the first MMT streaming data for the first screen and the second MMT streaming data for the second screen from the terminal 10, the multi-view service server 20 may transmit the requested first and second MMT streaming data to the terminal 10 (steps S201 and S203). For example, the multi-view service server 20 may send the first MMT streaming data for the first screen at 30 frames per second and send the second MMT streaming data for the second screen at 20 frames per second to the terminal 10. These steps may be performed at the same time.

Then, while the respective received streaming data is synchronized and played in accordance with the playback time information, the terminal 10 determines Whether a resizing event for the second screen occurs (step S205). If it is determined that the resizing event for the second screen occurs, the terminal 10 notifies the resizing event to the multi-view service server 20 (step S207). At this time, the terminal 10 may notify information about a previous size of the second screen, a changed current size of the second screen, a location of the second screen, or the like to the multi-view service server 20.

Then the multi-view service server 20 changes the resolution of the second streaming data for the second screen in response to the resizing event (step S209). For example, if the resolution of the second screen is changed from 320×128 to 640×480 according to the resizing event, the multi-view service server 20 that receives information about this event may reconstruct each MPU of the second MMT streaming data for the second screen in accordance with the changed resolution. Additionally, the multi-view service server 20 may adjust the number of frames according to the changed resolution and then reconstruct each MPU according to the adjusted number of frames.

In addition, the multi-view service server 20 inserts the playback time information into each reconstructed. MPU of the second MMT streaming data for the second screen and also inserts the playback time information into each MPU of the first MMT streaming data for the first screen (step S211). Then the multi-view service server 20 transmits the respective MMT streaming data to the terminal 10 (steps S213 and S215).

Then the terminal 10 identifies the playback time information of each MPU and also identifies the current time information thereof (step S217). In addition, the terminal 10 may synchronize and play the MPUs of the respective streaming data in accordance with the identified playback time information (step S219).

FIG. 10 is a flow diagram illustrating a multi-view streaming service providing method according to still another embodiment of the disclosure.

Referring to FIG. 10, in response to requests for the first MMT streaming data for the first screen and the second MMT streaming data for the second screen from the terminal 10, the multi-view service server 20 may transmit the requested first and second MMT streaming data to the terminal 10 (steps S301 and S303). These steps may be performed at the same time.

Then, while the respective received streaming data is synchronized and played in accordance with the playback time information, the terminal 10 determines whether a switching event between the first and second screens occurs (step S305). If it is determined that the switching event occurs, the terminal 10 notifies the switching event to the multi-view service server 20 (step S307). Here, the switching event refers to a user-requested event for switching between images respectively displayed on the first and second screens.

In addition, the terminal 10 may further notify information necessary for processing the switching event in the multi-view service server 20 to the multi-view service server 20.

Then, in response to the switching event, the multi-view service server 20 adjusts the resolution and frames of each of the first and second MMT streaming data so as to switch the first and second screens (step S309). In addition, the multi-view service server 20 inserts the playback time information into each MPU of the first and second MMT streaming data having the adjusted resolution and frames (step S311) and transmits the respective MMT streaming data to the terminal 10 (steps S313 and S315).

Then the terminal 10 identifies the playback time information of each MPU and also identifies the current time information thereof (step S317). In addition, the terminal 10 may synchronize and play the MPUs of the respective streaming data in accordance with the identified playback time information (step S319).

Heretofore, the multi-view streaming service providing method according to an embodiment of the disclosure has been described.

The aforesaid multi-view streaming service providing method according to an embodiment may be provided in the form of a non-transitory computer-readable medium suitable for storing computer program instructions and data. A program stored in a non-transitory computer-readable recording medium to implement the multi-view streaming service providing method according to an embodiment may execute steps of, at a terminal, transmitting a request for a first MPEG media transport (MMT) streaming data for a first screen and a second MMT streaming data for a second screen to a multi-view service server; at the terminal, identifying playback time information inserted in each media processing unit (MPU) of the first and second streaming data when the first and second streaming data are received from the multi-view service server; and at the terminal, synchronizing and playing the respective MPUs of the first and second streaming data in accordance with the identified playback time information.

In this case, a program recorded on the recording medium may perform the above-described functions by being read, installed and executed in the computer.

In order to allow the computer to read the program recorded on the recording medium and to execute the functions implemented by the program, the above-described program may include codes encoded in computer languages such as C, C++, JAVA, and machine language which can be read through a device interface of the computer by a processor (CPU) of the computer.

This code may include a function code related to a function or the like that defines the above-described functions, and may include an execution procedure-related control code necessary for the processor of the computer to execute the above-described functions in accordance with a predetermined procedure. Also, such a code may further include a memory reference related code as to Which additional information or media required for the processor of the computer to execute the above-described functions should be referenced at any location (address) of the internal or external memory of the computer. In addition, when the processor of the computer needs to communicate with any other computer, server, etc., which are at remote locations, to perform the above-described functions, the code may further include a communication-related code as to how to communicate with which remote computer, server, etc., what information or media should be transmitted or received during communication, and the like.

This non-transitory computer-readable medium, e.g., a recording medium, suitable for storing computer program instructions and data includes magnetic media such as a hard disk, a floppy disk, and a magnetic tape, optical media such as a compact disc read only memory (CD-ROM) and a digital versatile disc (DVD), magneto-optical media such as a floptical disk, and semiconductor memories such as a read only memory (ROM), a random access memory (RAM), a flash memory, an erasable programmable ROM (EPROM), and an electrically EPROM (EEPROM). A processor and memory may be supplemented by or integrated with specific-purpose logical circuit.

Further, the non-transitory computer-readable recording medium may be distributed over networked computer systems so that computer-readable code can be stored and executed in a distributed fashion. In addition, functional programs and their associated code and code segments for implementing the disclosure may be easily deduced or altered by programmers of the technical field of the disclosure in consideration of the system environment of a computer that reads a recording medium and executes the program.

While the disclosure contains many specific implementation details, these should not be construed as limitations on the scope of the disclosure or of what may be claimed, but rather as descriptions of features that may be specific to particular embodiments of particular disclosure. Certain features that are described in the disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Although operations are illustrated as being performed in a predetermined order in the drawings, it should not be construed that the operations are required to be performed sequentially or in the predetermined order, which is illustrated to obtain a preferable result, or that all of the illustrated operations are required to be performed. In some cases, multi-tasking and parallel processing may be advantageous. Also, it should not be construed that the division of various system components are required in all types of implementation. It should be understood that the described program components and systems are generally integrated as a single software product or packaged into a multiple-software product.

What is claimed is:

1. A terminal for providing a multi-view streaming service, the terminal comprising:
a communication module configured to connect to a network; and
a processor configured to:
transmit a request for a first MPEG media transport (MMT) streaming data for a first screen of the terminal and a second MMT streaming data for a second screen of the terminal to a multi-view service server through the network; and
receive the first MMT streaming data and the second MMT streaming data from the multi-view service server through the network,
wherein the processor includes:
a first screen control module configured to control the first MMT streaming data to be played on the first screen;
a second screen control module configured to control the second MMT streaming data to be played on the second screen;
a time generation module configured to identify current local time information of the terminal through the communication module; and
a playback control module configured to identify, in response to a request for multi-view streaming playback, universal time clock (UTC) information inserted in each media processing unit (MPU) of the first MMT streaming data and the second MMT streaming data,
wherein, in response to a receiving of first playback time information on a first MPU of the first MMT streaming data wherein the first playback time information is the same as second playback time information on a second MPU of the second MMT streaming data, the playback control module is configured to,
identify, from the current local time information of the terminal, a first reception time point at which the first MPU of the first MMT streaming data is received and a second reception time point at which the second MPU of the second MMT streaming data is received, and
control the first and second screen control modules to synchronize the first MMT streaming data and the second MMT streaming data such that the first MPU of the first MMT streaming data and the second MPU of the second MMT streaming data are played simultaneously based on the later among the first and second reception time points,
wherein the first playback time information and the second playback time information are starting time information on the first and second MPUs, respectively, based on the UTC.

2. The terminal of claim 1, wherein the playback control module is further configured to notify a switching event between the first and second screens to the multi-view service server when the switching event occurs, and to receive from the multi-view service server the first and second MMT streaming data changed according to the switching event.

3. The terminal of claim 1, wherein the playback control module is further configured to notify a resizing event for the second screen to the multi-view service server when the resizing event occurs, and to receive from the multi-view service server the second MMT streaming data changed according to the resizing event.

4. A method for providing a multi-view streaming service performed at a terminal comprising a processor and a communication module, the method comprising:
- connecting to a network through the communication module;
- transmitting, by the processor, a request for a first MPEG media transport (MMT) streaming data for a first screen of the terminal and a second MMT streaming data for a second screen of the terminal to a multi-view service server through the network;
- receiving, by the processor, the first MMT streaming data and the second MMT streaming data from the multi-view service server through the network;
- identifying, by the processor and in response to a request for multi-view streaming playback, universal time clock (UTC) information inserted in each media processing unit (MPU) of each of the first MMT streaming data and the second MMT streaming data;
- generating, by the processor, current local time information of the terminal through the communication module;
- in response to a receiving of first playback time information on a first MPU of the first MMT streaming data wherein the first playback time information is the same as second playback time information on a second MPU of the second MMT streaming data, identifying, from the current local time information of the terminal, a first reception time point at which the first MPU of the first MMT streaming data is received and a second reception time point at which the second MPU of the second MMT streaming data is received; and
- synchronizing, by the processor, the first MMT streaming data and the second MMT streaming data such that the first MPU of the first MMT streaming data and the second MPU of the second MMT streaming data are played simultaneously based on the later among the first and second reception time points,
- wherein the first playback time information and the second playback time information are starting time information on the first and second MPUs, respectively, based on the UTC.

* * * * *